United States Patent
Takaoka

(10) Patent No.: US 10,085,387 B2
(45) Date of Patent: Oct. 2, 2018

(54) PLANTER BOTTOM MEMBER AND PLANTER USING THE PLANTER BOTTOM MEMBER

(71) Applicant: TAKASHO CO., LTD., Wakayama-ken (JP)

(72) Inventor: Nobuo Takaoka, Wakayama-ken (JP)

(73) Assignee: TAKASHO CO., LTD., Wakayama-Ken (JP)

( * ) Notice: Subject to any disclaimer, the term of this patent is extended or adjusted under 35 U.S.C. 154(b) by 0 days.

(21) Appl. No.: 15/196,546

(22) Filed: Jun. 29, 2016

(65) Prior Publication Data

US 2017/0055459 A1     Mar. 2, 2017

Related U.S. Application Data

(63) Continuation of application No. PCT/JP2015/081939, filed on Nov. 13, 2015.

(30) Foreign Application Priority Data

Aug. 28, 2015   (JP) .................................. 2015-168615

(51) Int. Cl.
*A01G 9/02* (2018.01)
*A01G 9/04* (2006.01)

(52) U.S. Cl.
CPC ............... *A01G 9/042* (2013.01); *A01G 9/02* (2013.01)

(58) Field of Classification Search
CPC . A01G 9/042; A01G 9/04; A01G 9/02; A01G 9/045; A01G 9/10; A01G 9/1026

(Continued)

(56) References Cited

U.S. PATENT DOCUMENTS

| 1,391,353 | A | * | 9/1921 | Wells | ..................... | A47G 7/041 |
| | | | | | | 47/71 |
| 4,315,382 | A | * | 2/1982 | Kay | ....................... | A01G 9/042 |
| | | | | | | 47/71 |

(Continued)

FOREIGN PATENT DOCUMENTS

| CA | 2914250 A1 * | 12/2014 |
| GB | 2511616 | * 9/2014 |

(Continued)

OTHER PUBLICATIONS

JP 2004166662A, Shuchi, Jun. 17, 2004, English Translation.*

*Primary Examiner* — Magdalena Topolski
(74) *Attorney, Agent, or Firm* — Wenderoth, Lind & Ponack, L.L.P.

(57) ABSTRACT

A planter bottom member is attached to a side wall member formed of a wood material and having a cylindrical shape that is open at upper and lower sides. The planter bottom member is formed of a synthetic resin and includes a lower surface cover portion, a lower end receiving portion for receiving a lower end surface of the side wall member, an outer wall cover portion for covering an outer circumferential surface of a lower end portion of the side wall member and a bottom portion having a draining hole. The lower end opening of the side wall member is closed by the bottom portion, the lower surface of the side wall member is covered by the lower surface cover portion, and the lower end outer circumferential surface of the side wall member is covered by the outer wall cover portion.

3 Claims, 5 Drawing Sheets

(58) Field of Classification Search
USPC .................................. 47/65.5, 65.6, 65.7, 71
See application file for complete search history.

(56) References Cited

U.S. PATENT DOCUMENTS

| | | | | |
|---|---|---|---|---|
| 8,347,552 B1* | 1/2013 | Johnson, III | ........... | A01G 9/042 47/81 |
| 9,038,312 B2* | 5/2015 | Harbaugh | ................ | A01G 9/02 47/65.5 |
| 2009/0229180 A1* | 9/2009 | Rich | ...................... | A47G 7/041 47/66.6 |
| 2012/0260570 A1* | 10/2012 | Harbaugh | .............. | A01G 9/042 47/65.7 |
| 2013/0133255 A1* | 5/2013 | Wu | ........................ | A01G 27/02 47/66.1 |
| 2015/0250107 A1* | 9/2015 | Joseph | ................... | A01G 9/042 47/79 |
| 2016/0150740 A1* | 6/2016 | Rentzhog | ................. | A01G 9/02 47/66.1 |
| 2016/0198641 A1* | 7/2016 | Lee | .......................... | A01G 9/02 47/65.5 |

FOREIGN PATENT DOCUMENTS

| | | |
|---|---|---|
| JP | 3041951 | 7/1997 |
| JP | 2004-166662 | 6/2004 |

* cited by examiner

PLANTER BOTTOM MEMBER AND PLANTER USING THE PLANTER BOTTOM MEMBER

CROSS REFERENCE TO RELATED APPLICATIONS

This application is a continuation of International Application PCT/JP2015/081939 filed on 13 Nov. 2015, which claims benefit of Japanese patent application JP 2015-168615 filed on 28 Aug. 2015, both of which are incorporated herein by reference in their entireties.

BACKGROUND OF THE INVENTION

1. Technical Field

The present disclosure relates to a planter bottom member, and a planter using the planter bottom member.

2. Description of the Related Art

Planters made from a wood material are in great demand because of their good appearance and luxurious feel. However, if the wood material keeps absorbing moisture, the wood material is likely to decay or become moldy, thus deteriorating the appearance and causing a problem with durability.

Accordingly, the following planter has been proposed and marketed: a cylindrical side wall is formed by a wood plate material, a groove is formed at a lower part of the inner circumferential surface of the side wall, and a synthetic resin plate material having a rib at the periphery thereof and a plurality of bosses formed on a lower surface thereof is fitted such that the peripheral rib of the plate material is fitted to the groove of the side wall and a lower end surface of the boss coincides with a lower end surface of the side wall, thereby forming the planter (see Japanese Laid-Open Patent Publication No. 2004-166662).

That is, since the side wall is formed by a wood plate material, the planter has designability. In addition, of the planter, the bottom, which is likely to be exposed to water during the longest time, is formed of a synthetic resin plate material. Therefore, as compared to a conventional wooden planter the bottom of which is also formed of a wood material, the bottom is less likely to decay and the durability is improved.

However, a planter can sometimes be directly placed at a balcony, an entrance porch, a garden, or the like, and therefore, if a floor surface or a ground surface becomes wet by water used in watering, or rainwater, the lower end of the side wall of the planter is kept wet over a long period of time.

Thus, in the case of the planter in JP 2004-166662, since the side wall, including its lower end, is formed of a wood material, there is a problem that the lower end side of the side wall is likely to be decayed, and a problem with mold or the like is likely to occur.

In view of the above circumstances, an object of the present disclosure is to provide: a planter bottom member that provides improved durability by suppressing decay or the occurrence of mold or the like on the side wall lower end side of a planter having a wooden side wall; and a planter using the planter bottom member and having excellent durability.

SUMMARY OF THE INVENTION

To achieve the above object, a planter bottom member (hereinafter, referred to as "bottom member of the present disclosure") according to the present disclosure is a planter bottom member formed of a synthetic resin which is provided so as to close a lower opening of a side wall member formed of a wood material and having a cylindrical shape that is open at upper and lower sides. The planter bottom member includes: a lower surface cover portion having a ring shape in plan view; an outer wall cover portion formed continuously from the lower surface cover portion and provided so as to cover an outer circumferential surface of a lower end portion of the side wall member; and a bottom portion formed continuously inward from the lower surface cover portion and having draining holes.

In the present disclosure, although not particularly limited, examples of resins forming the bottom member include polypropylene, polyethylene, ABS resin, and polycarbonate.

In the present disclosure, the side wall member may include a metallic part or a resin part such as an adhesive, in a hoop material, a nail, a screw, or the like, but is substantially formed of wood materials.

In addition, the side wall member may be formed by hollowing out a pure wood material. However, preferably, wooden plate materials are combined into a side wall shape, because in this case, the material cost can be reduced and the strength can be enhanced.

Preferably, in the bottom member of the present disclosure, the lower surface cover portion has lower end receiving portions protruding upward from a bottom of the lower surface cover portion, arranged intermittently along a circumferential direction, and configured to receive a lower end of the side wall member such that the lower end is lifted from the bottom of the lower surface cover portion.

That is, a space as large as possible is provided at the lower end of the side wall member, and thereby the lower end of the side wall member can be prevented from being immersed in water, as much as possible.

In the bottom member of the present disclosure, the bottom portion may include a bottom portion body, and a connection portion connecting the bottom portion body to the lower surface cover portion and supporting the bottom portion body so as to be located higher than the lower end of the side wall member, and draining holes may be formed at least in the bottom portion body.

Preferably, the bottom portion body includes a disk-like portion having draining holes in a mesh shape, and a plurality of conical protrusions protruding upward and downward from the disk-like portion and each having slit-like draining holes formed in a circumferential surface thereof.

That is, even if the bottom portion body is thinned, the bottom portion body can withstand the weight of soil in the planter. As a result, the material cost for the bottom member can be reduced as a result of the thinning.

Since the slit-like draining holes are formed, sufficient draining performance can be ensured by the draining holes, and the draining holes also serve as ventilation holes, thereby improving performance of ventilation into the soil.

A planter according to the present disclosure includes: the above bottom member of the present disclosure; and a side wall member made of wood and having a cylindrical shape. The bottom member is attached to the side wall member such that a lower end of the side wall member is covered from below by the lower surface cover portion, and a lower end outer circumferential surface of the side wall member is covered by the outer wall cover portion of the bottom member.

As described above, when the bottom member is attached such that the lower end surface of the wooden side wall member is received by the lower end receiving portion, the lower end surface is covered by the lower end cover portion, and the lower end outer circumferential surface is covered by the outer wall cover portion.

Thus, in the obtained planter of the present disclosure, the lower end portion of the side wall member is covered by a synthetic resin, breakage due to decay of the lower end portion of the side wall member and deterioration of the outer appearance due to the occurrence of mold or the like can be prevented.

That is, the durability of the planter can be improved. In addition, since the side wall member is made of wood, the planter is also excellent in terms of design and has a luxurious feeling.

DESCRIPTION OF EMBODIMENTS OF THE INVENTION

Hereinafter, the present invention will be described in detail with reference to embodiments thereof.

Figure 1:
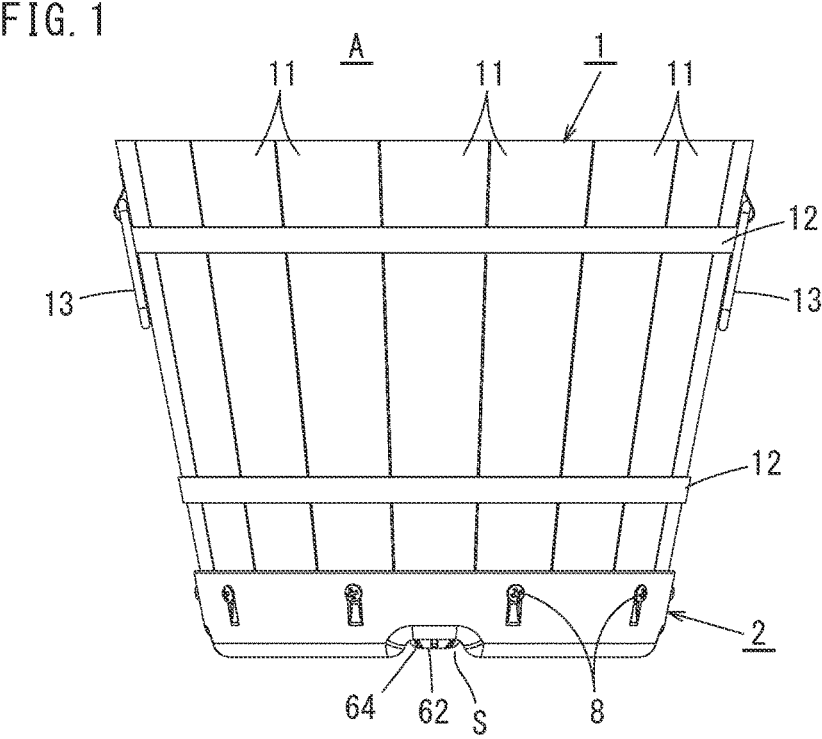
FIG. 1 is a front view showing an embodiment of a planter of the present disclosure.
Figure 2:
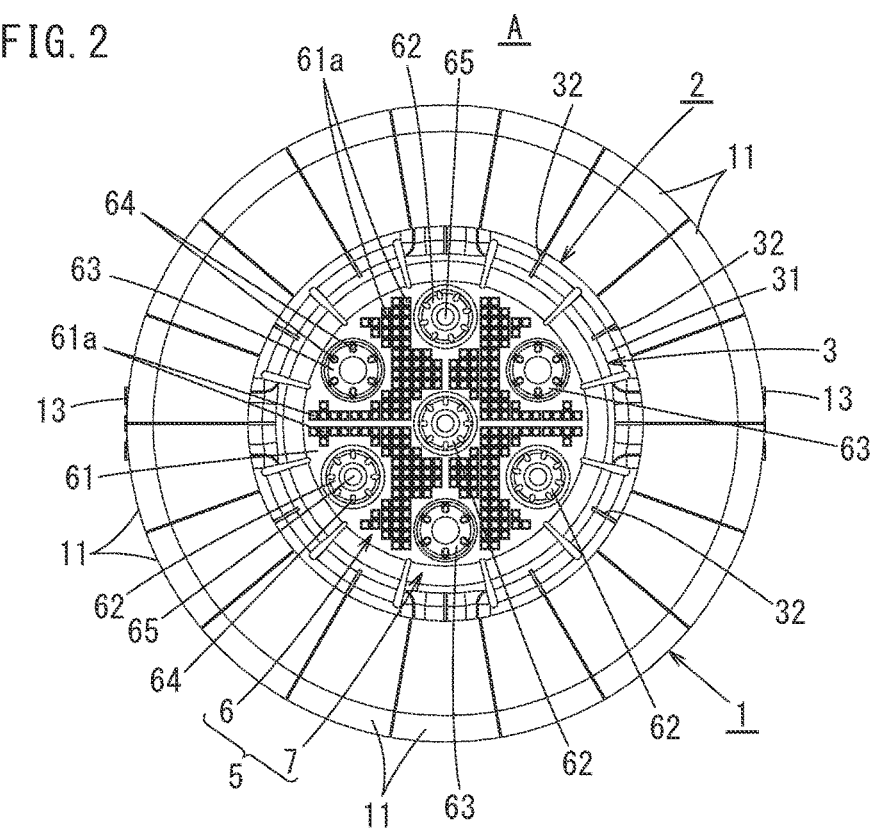
FIG. 2 is a plan view of the planter in FIG. 1.
Figure 3:
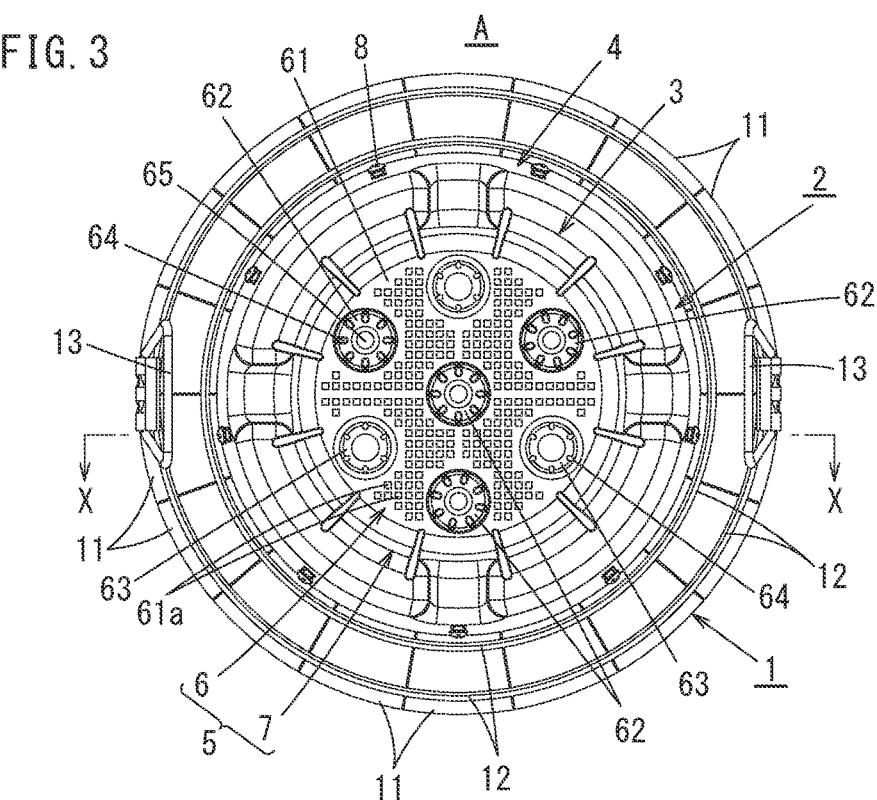
FIG. 3 is a bottom view of the planter in FIG. 1.
Figure 4:
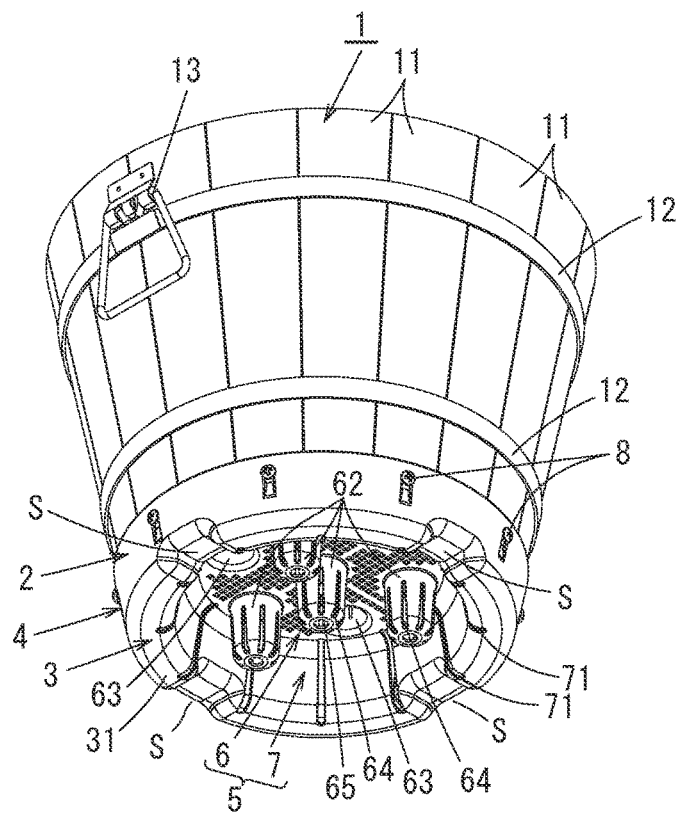
FIG. 4 is a perspective view of the planter in FIG. 1 as seen from the bottom surface side thereof.
Figure 5:
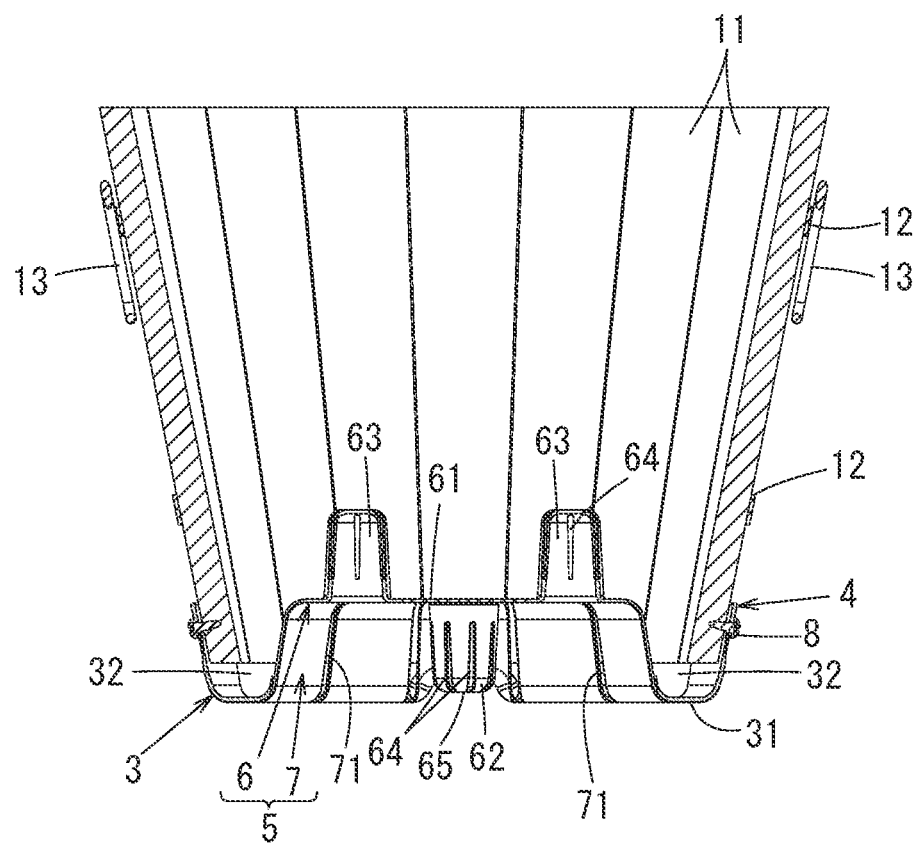
FIG. 5 is an X-X sectional view of FIG. 3.
Figure 6:
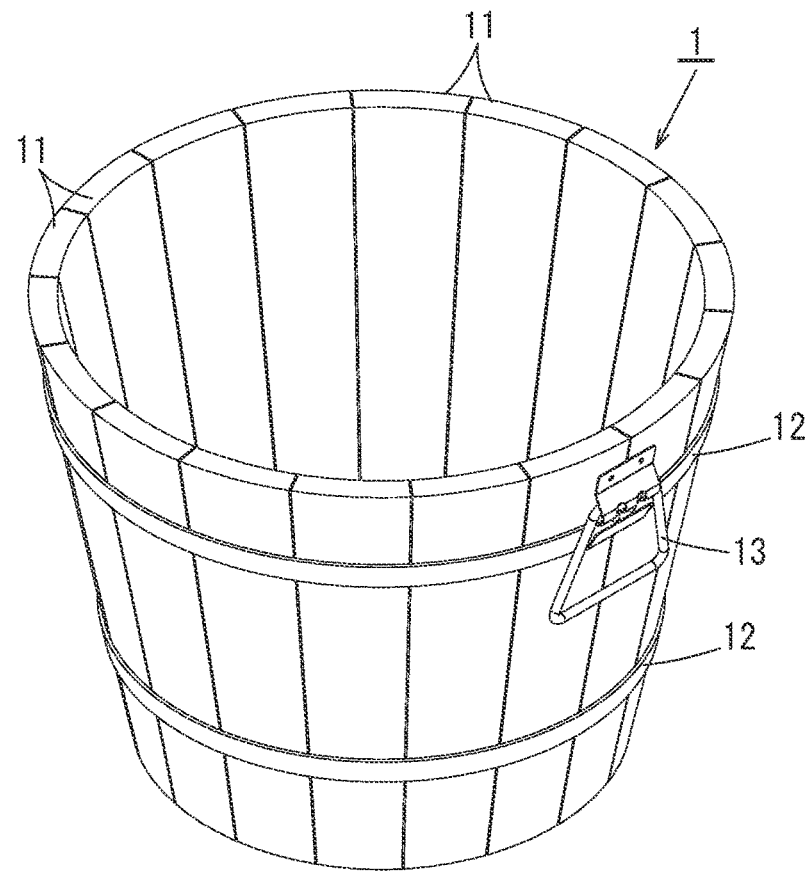
FIG. 6 is an exploded perspective view of the planter in FIG. 1.
Figure 6:
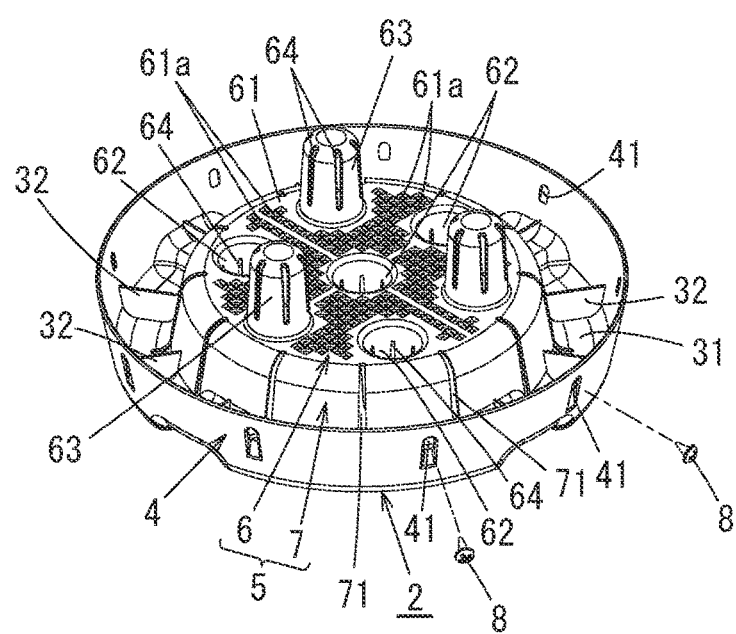
Figure 7:
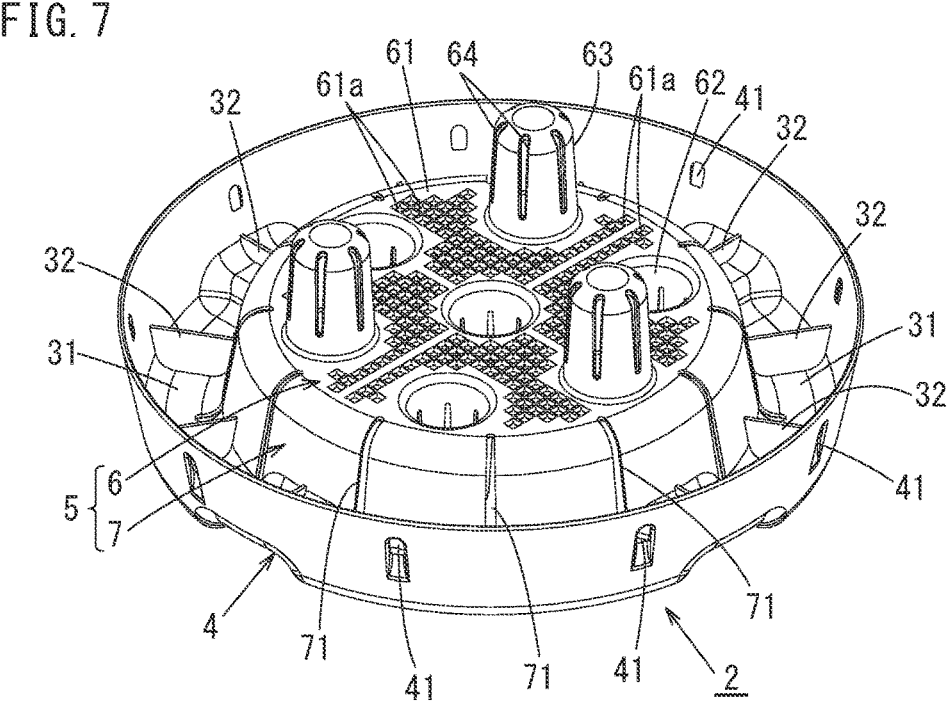
FIG. 7 is a perspective view of a bottom member of the present disclosure.
Figure 8:
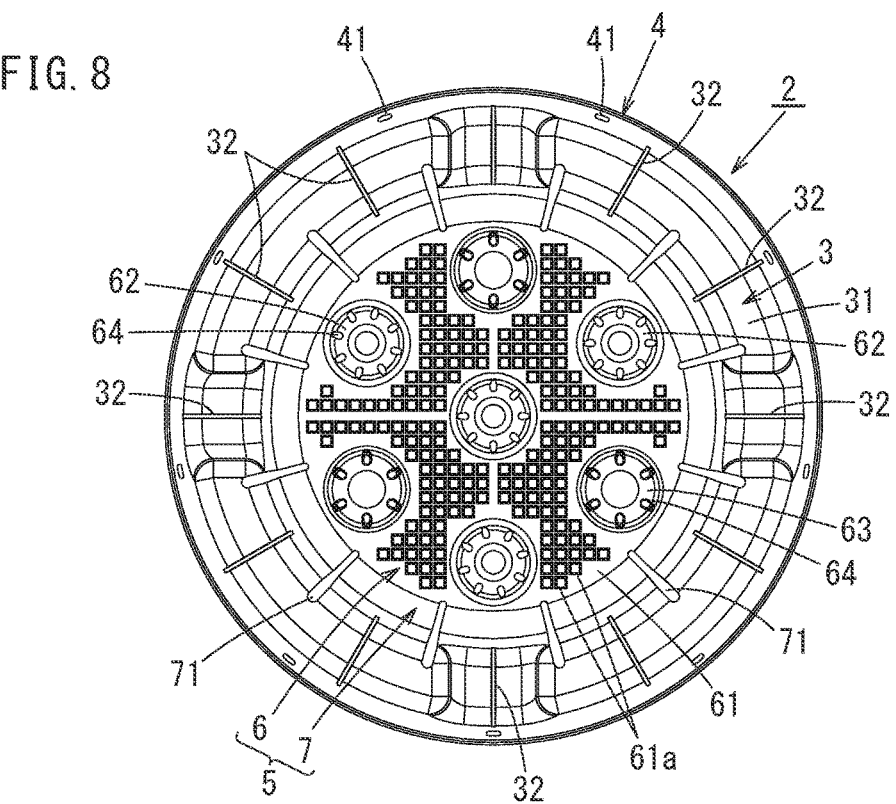
FIG. 8 is a plan view of the bottom member in FIG. 7.

FIG. 1 to FIG. 6 show an embodiment of a planter of the present disclosure, and FIG. 7 and FIG. 8 show a bottom member used for the planter.

As shown in FIG. 1 to FIG. 6, a planter A is formed by assembling a side wall member 1 and a bottom member 2.

The side wall member 1 is formed by a plurality of wooden plate materials 11 formed in a cylindrical shape by means of tongue-and-groove joint, tenon joint, or bonding, or a combination of these, and the diameter of the side wall member 1 decreases from the upper side toward the lower side.

The side wall member 1 is provided with metallic belt-like materials 12 as hoop materials wound along the outer circumferential surface at two locations in the vertical direction, and is tightened in the circumferential direction by the metallic belt-like materials 12. Metallic grips 13 are attached to the side wall member 1.

The bottom member 2 is obtained by injection molding using a thermoplastic resin such as polypropylene resin, and has a lower surface cover portion 3, an outer wall cover portion 4, and a bottom portion 5 as shown in FIG. 1 to FIG. 8.

The lower surface cover portion 3 has a ring shape in plan view, and has, at a bottom 31 thereof, lower end receiving portions 32 which are arranged at equal pitches along the circumferential direction, protrude upward, and have a thin plate shape.

In the lower surface cover portion 3, the bottom 31 thereof is formed so as to ascend and descend repeatedly in a step shape along the circumferential direction, so that gaps S for draining are intermittently formed between the ascending portion and the planter placement surface.

The outer wall cover portion 4 is provided so as to extend upwardly on the outer circumferential side of the lower surface cover portion 3, and cover the lower end outer circumferential surface of the side wall member 1.

As shown in FIG. 7 and FIG. 8, the outer wall cover portion 4 has fixation screw insertion holes 41 are formed at regular intervals along the circumferential direction.

The bottom portion 5 has a bottom portion body 6 and a connection portion 7.

The bottom portion body 6 has a disk-like portion 61, four first protrusions 62, and three second protrusions 63.

The disk-like portion 61 has multiple draining holes 61a formed in a mesh shape.

The first protrusions 62 are provided such that one of the four first protrusions 62 is located at the center of the bottom portion body 6, and the other three first protrusions 62 are arranged at equal pitches along the same circumference outside the center first protrusion 62. Each first protrusion 62 protrudes in a conical shape downward from the disk-like portion 61.

Each first protrusion 62 has slit-like draining holes 64 provided at an equal pitch (spacing) along the circumferential direction in the circumferential surface of the first protrusion 62, and has a round-shaped draining hole 65 formed at a tip end thereof.

The second protrusions 63 are arranged on the same circumference as the three outside first protrusions 62, at positions between the first protrusion 62 and the first protrusion 62. Each second protrusion 63 protrudes in a conical shape upward from the disk-like portion 61.

Each second protrusion 63 has slit-like draining holes 64 provided at an equal pitch along the circumferential direction in the circumferential surface of the second protrusion 63.

The connection portion 7 connects the bottom portion body 6 and the lower surface cover portion 3, and has slit-like draining holes 71 reaching the bottom 31 of the lower surface cover portion 3 and provided at an equal pitch along the circumferential direction.

The bottom member 2 is combined with the side wall member 1 such that the lower end portion of the side wall member 1 is covered by the outer wall cover portion 4, and the lower end receiving portion 32 comes into contact with the lower end of the side wall member 1, and then fixation screws 8 are screwed into the side wall member 1 via the fixation screw insertion holes 41 formed in the outer wall cover portion 4, whereby the bottom member 2 is fixed to the side wall member 1.

In the planter A, although not particularly limited, the magnitude of the draining hole 61a in the disk-like portion 61 is 3 to 4 mm square, the width of the draining hole 64 is 1.5 to 2.5 mm, the diameter of the draining hole 65 is 3 to 4 mm, and the width of the draining hole 71 is 3 to 4 mm.

In the planter A, as described above, the lower surface of the side wall member 1 is covered by the lower surface cover portion 3 of the bottom member 2, and the lower end outer wall surface of the side wall member 1 is covered by the outer wall cover portion 4. Therefore, even if water used in watering or rainwater is accumulated on a floor or a garden, the lower end portion of the side wall member 1 is prevented from being exposed to the accumulated water or the like during a long period of time.

Even if mold or the like should occur at the lower end of the side wall member 1, the mold or the like is invisible from outside due to the covering by the outer wall cover portion 4, so that the outer appearance is not spoiled.

In addition, the lower end surface of the side wall member 1 is supported from below intermittently by the lower end receiving portions 32 protruding upward from the bottom 31 of the lower surface cover portion 3, so that the lower end surface of the side wall member 1 is lifted from the bottom 31. Therefore, immersion into the accumulated water or the like is further prevented.

Thus, decay due to wetting of the lower end portion of the side wall member 1 can be prevented, and the durability is improved.

In addition, since the bottom portion body 6 is provided with the first protrusions 62 and the second protrusions 63, and the draining holes 64 and 65 are formed in the first protrusions 62 and the second protrusions 63, sufficient draining performance is ensured and ventilation in the depth direction of the planter A is also ensured. Thus, root rot or the like is less likely to occur.

In addition, since the first protrusion 62 protruding downward is provided at the center of the bottom portion body 6, the weight of soil loaded in the planter A can be reliably received at the center.

Further, since the gaps S are formed between the lower surface cover portion 3 and the planter placement surface, the bottom portion 5 can be easily exposed to the external air via the gaps S, and thus further ventilation is ensured.

In addition, since the bottom portion body 6 is lifted upward by the connection portion 7, a space can be obtained under the bottom portion body 6, whereby the draining performance and the ventilation performance can be improved.

Further, since the connection portion 7 has slit-like draining holes 71 reaching the bottom 31 of the lower surface cover portion 3, water can be prevented from being accumulated on the bottom 31 of the lower surface cover portion 3.

The present disclosure is not limited to the above embodiment. For example, in the above embodiment, the side wall member has such a truncated-cone cylindrical shape that the diameter thereof decreases downward, but the side wall member may have an elliptic shape, an oblong shape, or a polygonal shape in plan view. In addition, the diameter may not necessarily decrease downward.

In the above embodiment, the grips are attached to the side wall member, but the grips may not be provided.

In the above embodiment, the fixation screw insertion holes are provided in the outer wall cover portion, and the fixation screws are screwed into the side wall member via the fixation screw insertion holes, whereby the bottom member is fixed to the side wall member. However, without fixation, these members may be easily attachable and detachable with each other by elastic fitting or the like.

In the above embodiment, the bottom portion body has four first protrusions and three second protrusions. However, the numbers of the first protrusions and the second protrusions may be determined as appropriate in accordance with the magnitude or the shape of the bottom portion body, or such protrusions may not be provided.

What is claimed is:

1. A planter comprising:
a side wall member formed of a wood material and having a cylindrical shape open at upper and lower sides thereof, and
a planter bottom member formed of a synthetic resin for closing the lower opening of the side wall member, the planter bottom member further comprising:
a lower surface cover portion having a ring shape;
an outer wall cover portion formed integrally with the lower surface cover portion, the outer wall cover portion being configured to cover an outer circumferential surface of only a lower end portion of the side wall member; and
a bottom portion formed continuously inward from the lower surface cover portion and having draining holes; wherein
the planter bottom member is attached to the side wall member such that a lower end of the side wall member is covered from below by the lower surface cover portion, and a lower end outer circumferential surface of the side wall member is covered by the outer wall cover portion of the planter bottom member,
wherein the lower surface cover portion has lower end receiving portions protruding upward from an upper surface of the lower surface cover portion, the lower end receiving portions being arranged intermittently along a circumferential direction, and configured to receive the lower end of the side wall member of the planter such that the lower end of the side wall member can be supported above the upper surface of the lower surface cover portion,
wherein the bottom portion includes a bottom portion body, and a connection portion connecting the bottom portion body to the lower surface cover portion so as to support the bottom portion body at a higher level than the upper surface of the lower surface cover portion,
wherein a first plurality of the draining holes are formed in the connection portion in the form of slits, and the slits are disposed intermittently along the circumferential direction of the connection portion and each of the slits extends to a bottom of the lower surface cover portion so that lower ends of the slits are below upper ends of the lower end receiving portions.

2. The planter according to claim 1, wherein a second plurality of the draining holes are formed in the bottom portion body.

3. The planter according to claim 2, wherein the bottom portion body has a disk shape and includes a plurality of conical protrusions protruding upward and downward, and each of the conical protrusions includes some of the draining holes in the form of slits, and the slits are formed in a circumferential surface thereof.

* * * * *